KATSUNORI SHIMADA
SCOTT S. LUEBBERS
INVENTORS
BY
ATTORNEYS

KATSUNORI SHIMADA
SCOTT S. LUEBBERS
*INVENTORS*

BY [signature]
[signature]
ATTORNEYS

United States Patent Office 3,532,960
Patented Oct. 6, 1970

3,532,960
THERMIONIC DIODE SWITCH

James E. Webb, Administrator of the National Aeronautics and Space Administration, with respect to an invention of Katsunori Shimada, Pasadena, and Scott S. Luebbers, La Crescenta, Calif.
Filed May 10, 1968, Ser. No. 728,234
Int. Cl. H02m 3/26, 7/46, 3/00
U.S. Cl. 321—2 7 Claims

ABSTRACT OF THE DISCLOSURE

A thermionic diode switch for use in a high-temperature region to chop the current from a high-temperature D.C. power source. The switch consists of a thermionic diode across which a potential is applied. The diode is switchable from a low-current to a high-current mode by increasing the potential thereacross above an ignition voltage level. Switching from the high-current to the low-current mode is achieved by decreasing the potential below an extinction voltage level.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Field of the invention

This invention generally relates to a solid state switching system and, more particularly, to a switching system which incorporates a thermionic diode to condition power from a low-voltage high-temperature power source.

Description of the prior art

Solid-state switching systems are currently being used to condition, such as by chopping, the output from a D.C. low-voltage high-current power source. Typically, these solid-state switching systems incorporate semiconductor devices, such as transistors which suffer from inherent temperature limitations. Consequently, a solid-state switching system, which incorporates presently known semiconductor devices, must be located remotely from any power source which operates in a high-temperature environment, such as a thermionic or thermoelectric power converter.

The remote location of the solid-state switching system, which may hereafter also be referred to as the "chopper," from the power source results in excessive power losses due to the relatively long power lines which are required to connect the power source to the chopper.

Since the efficiency of any present day high-temperature power source is relatively low, the added losses which result from the remote location of the chopper therefrom are most undesirable. In some applications, such losses may be unacceptable since they may reduce the overall system efficiency below a minimum acceptable level. Also, semiconductor devices are susceptible to damage caused by radiation of the type present in nuclear reactors. Consequently, the semiconductor devices must be remotely located from any radiation-producing source, further limiting the use presently known choppers.

OBJECTS AND SUMMARY OF THE INVENTION

It is a primary object of the present invention to provide a new switching system for use with a high-temperature power source.

Another object of the invention is to provide a novel switching system which is operable in high-temperature environment.

A further object of the present invention is the integration of a solid state switching system in a low-temperature environment that eliminates the requirement of relatively long heavy current leads between a high-temperature power source and a chopper or power conditioner.

Still a further object of the present invention is the provision of a switchhing system, which is operable at temperatures closely associated with the temperatures of operation of thermionic, thermoelectric converters and the like, for chopping or switching within the high-temperature environment, rather than external thereto.

These and other objects of the invention are achieved by providing a switching system which incorporates a high-temperature thermionic diode, operated in a novel manner to perform current chopping, or switching rather than serve as a power converter which is the typical function which thermionic diode perform. Since the thermionic diode which is incorporated in the switching system of the present invention is used for current switching only, it may be referred to hereafter as the thermionic switch. The thermionic switch, like a conventional power-providing thermionic diode requires relatively high temperature for its operation. Consequently, its location in the high-temperature environment is not only not desirable but rather a requirement.

The thermionic switch, within the high-temperature environment, is connected in series with a power-transferring element across a high-temperature power source. The power transferring element may comprise the primary winding of a transformer whose secondary winding is connected to leads which supply the chopped power to devices located outside the high-temperature environment.

The thermionic switch is provided with a sequence of mode control pulses which switch the thermionic switch between a high-current mode and a low-current mode of operation. Consequently, the level of the current which flows in the transformer's primary winding is switched between two levels, producing an alternating current. Thus, current switching or chopping occurs in the high-temperature environment, thereby eliminating the lead losses typical of prior art systems in which signal chopping takes place outside the high-temperature environment.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
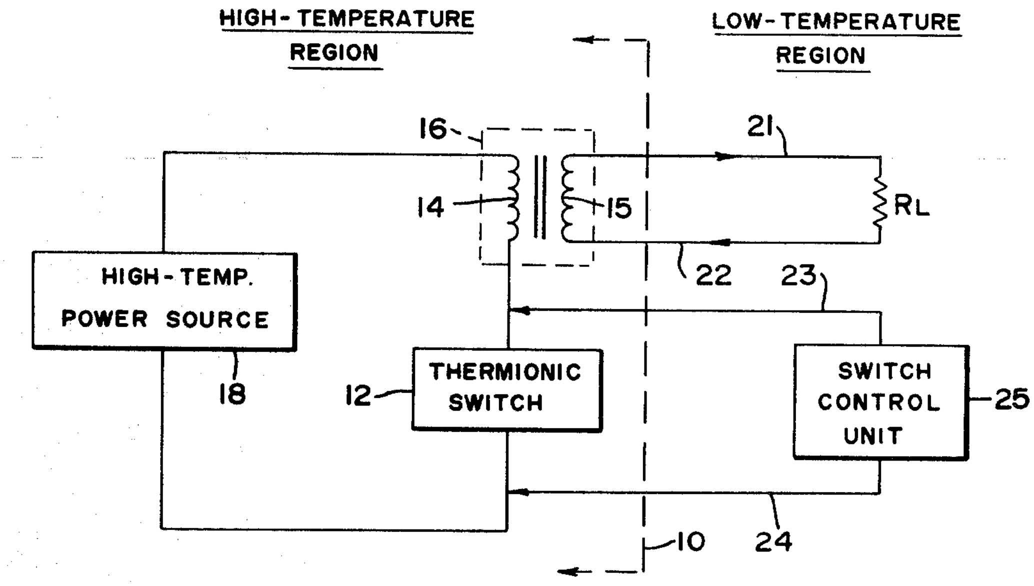
FIG. 1 is a combination schematic and block diagram of a basic embodiment of the invention.

Reference is now made to FIG. 1 wherein all the elements and circuts shown in block form to the left of line 10 are assumed to be in a high-temperature environment or region, and those shown to the right of the line in a low-temperature region in which semiconductor diodes and like devices can operate. In accordance with the teachings of this invention, a thermionic switch 12 is connected in series with a primary winding 14 of a step-up transformer 16 across a high-temperature power source 18 in the high-temperature region. The secondary winding 15 of the transformer 16 is connected to a load, represented by a resistor $R_L$ in the low-temperature region by means of leads 21 and 22. Likewise, a pair of leads 23 and 24 connect a switch control unit 25 in the low-temperature region across the thermionic switch 12.

Briefly, the function of the switch control unit 25 is to control, with mode control pulses, the thermionic switch 12 to switch between high-current and low-current modes of operation. This causes a current of an alternating amplitude to flow in the winding 14, resulting in the supply of a chopped or alternating current from the high-temperature region to the load $R_L$ in the low-temperature region.

Figure 2:
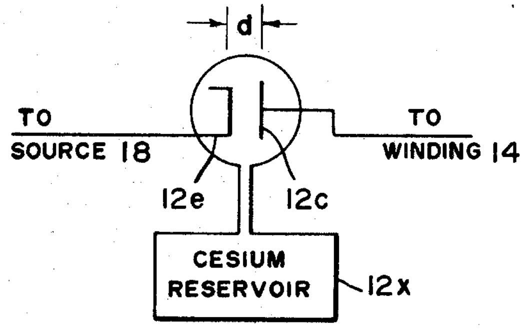
FIG. 2 is a simplified diagram of cesiated thermionic diode.

The thermionic switch 12 is actually a thermionic diode similar in most respects to known thermionic diodes or converters, which herebefore have been designed and used to convert thermal energy to electrical energy. That is, thermionic switch 12 consists of a diode, such as the one diagrammed in FIG. 2 having an emitter **12*e* and a collector 12*c***, with the space or gap *d* therebetween filled with vapor of a gas, such as cesium, which is supplied from a reservoir **12*x*. However, whereas in the prior art the emitter-collector gap, and the temperatures of the emitter, collector and cesium $T_E$, $T_C$ and $T_{CS}$ respectively are controlled to generate electrical energy or power, in the present invention, the diode (switch 12**) is used to act as a current switch. This is accomplished by switching the diode between a first mode in which a high-current flows through it and a second mode in which a very low-current flows therethrough.

Figure 3:
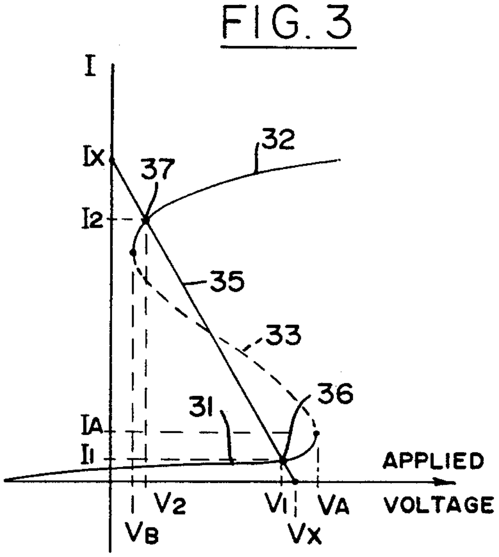
FIGS. 3 and 4 are voltage versus current curves, useful in explaining the invention.

The dual mode of operation of the thermionic switch 12 is based on the discovery that an appropriately designed thermionic diode may be switched between high-current and low-current modes of operation as a function of the instantaneous voltage applied thereacross. This principle may best be described in conjunction with FIG. 3 to which reference is made herein. FIG. 3 is a diagram of applied voltage V across the thermionic switch 12 versus the current I therethrough. It has been discovered that a thermionic diode, across which a voltage is applied, has two separate and distinct stable regions or modes of operation, designated in FIG. 3 by lines 31 and 32, which are shown interconnected by a dashed line 33. Line 31 may be thought of as representing a low-current mode and line 32 a high-current mode.

Assuming that the diode is in the low-current mode, then as long as the voltage which is applied thereacross is less than $V_A$, which represents an ignition voltage, the diode remains in the low-current mode in which only a low current, less than $I_A$, flows therethrough. However, by increasing the voltage across the diode above $V_A$, the diode is switched to a high-current mode in which a very high current flows through the diode at a small voltage $V_2$ thereacross. The diode remains in the high-current mode until the voltage across is decreased below a low voltage $V_B$ which can be thought of as the extinguishing voltage.

The actual voltage-current relationship and the values of $V_A$ and $V_B$ depend on the temperatures $T_E$, $T_{CS}$, the gap *d* between the emitter and collector of the diode, the emitter work function $\phi_E$ and the collector work function $\phi_C$. However, for any combination of such parameters there exists a unique voltage-current relationship. The steady state conditions of voltage across and current through the diode in either mode depends on the voltage of the power source 18 and the reflected resistance which is connected in series with the thermionic switch. For example, assuming a power source 18 of a voltage $V_X$, and a reflected load resistance $R_X$, a load line 35 may be drawn between $V_X$ and $I_X$, where $$I_x=\frac{V_x}{R_x}$$

The point of intersection 36 of line 35 with line 31 represents the steady state condition in the low-current mode indicating a voltage across the diode of $V_1$ and a current of $I_1$. Similarly, the point of intersection 37 of line 35 with line 32 represents the steady state condition in the high-current mode indicating a voltage $V_2$ across the diode and a current $I_2$ flowing therethrough.

It has been found that the current flowing through the thermionic switch 12 in the high-curernt mode, i.e., current $I_2$ is in the order of 100 times the current $I_1$ flowing through the switch in the low-current mode. Thus, the thermionic switch provides a high current switching capability. It should also be pointed out that the power required to switch the mode of operation is quite low. When operating in the low-current mode (line 31, FIG. 3), the voltage across the switch 12 has to be increased momentarily from $V_1$ to above $V_A$, while the current is quite low. Thus, the total required switching power is low. Similarly, when operating in the high-current mode, though the current is high, the voltage that has to be applied, namely $V_2-V_B$ is very low and therefore, the total power required is similarly quite low.

Figure 4:
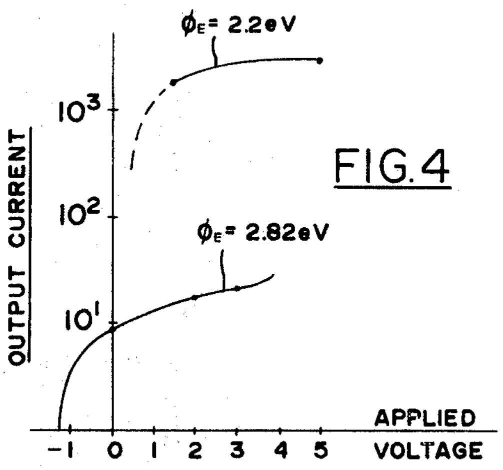

The novel aspects of the present invention may further be explained by referring to FIG. 4 which is a volt-ampere characteristic plotted as a curve for a thermionic switch, actually reduced to practice. The temperatures of the emitter, collector and cesium of the particular switch and the cesium pressure-gap (*pd*) value were as follows:

$T_E=1287°$ K.
$T_C\simeq650°$ K.
$T_{CS}=410°$ K.
pd=0.128 mil-torr.

A reflected load resistance was chosen so that with a high-temperature power source of about 3.5 volts, the switch switched between 20 ma. at 3 volts in the low-current mode and 2 amperes at 2 volts in the high-current mode.

As seen from FIG. 4, the ignition voltage for the particular switch was about 3.8 volts. Thus, by increasing the voltage across the switch by about 1 volt, the switch was driven to its high-current mode. A voltage pulse of about −1 volt was sufficient to return the switch to its low-current mode.

In another embodiment of the thermionic switch, higher emitter and cesium temperatures were utilized to cause the termionic switch to switch between 0.1 amperes at 3 volts and 25 amperes at 0.5 volt.

It has been established that the thermionic switch of the present invention operates most satisfactorily at temperatures $T_E\leq1400°$ K., $T_{CS}\simeq450°$ K. and with an emitter-collector gap in the range of 30 mils. These temperatures are generally lower than those required when a thermionic diode is operated as a power converter which is the typical function herebefore performed by such a diode. The reduced temperatures of the switch of the present invention are highly desirable since they minimize internal losses due to electron scattering by cesium atoms and generally extend the diode's useful life. Also, the relatively large gap as compared with the gap required in a power converting diode is advantageous since it simplifies the machining problems encountered in constructing the diode.

Figure 5:
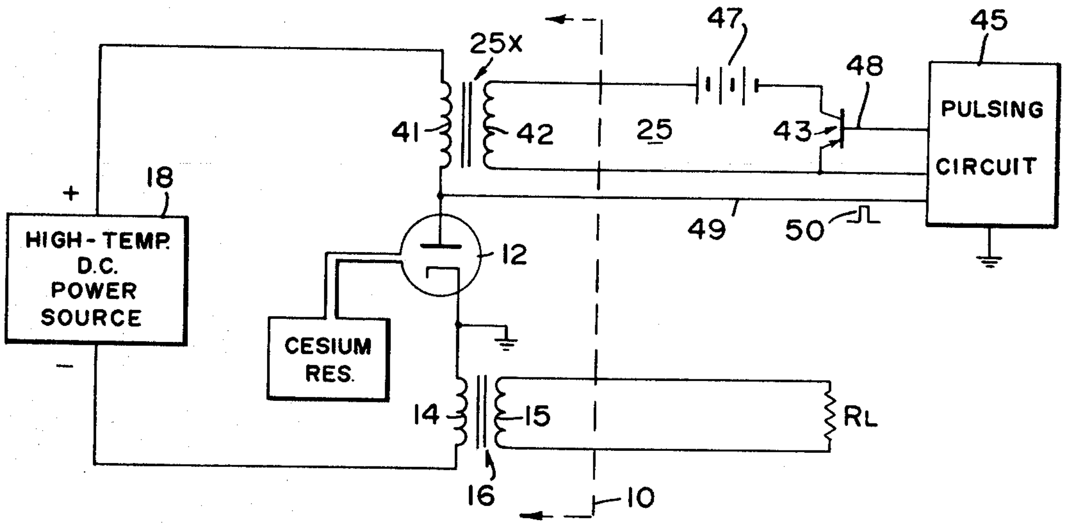
FIGS. 5 and 6 are combination schematic and block diagrams of two embodiments of the invention.

Reference is now made to FIG. 5 which is a combination block and schematic diagram of the thermionic switching system of the present invention, shown with a specific switch control unit. In FIG. 5, elements like those previously described are designated by like numerals. Therein, the switch control unit 25 is shown including a transformer **25*x* located in the high temperature region. The secondary winding 41 of the transformer 25*x* is connected in series with the thermionic switch 12 while the primary winding 42 is connected to the emitter of a transistor 43 and to a pulsing circuit 45, while the other end of the winding is connected to a D.C. bias source, such as battery 47, whose other terminal is connected to the collector of transistor 43. The base of the transistor 43 is connected to circuit 45 by a line 48, while a line 49 connects the collector of the switch 12 to the pulsing circuit 45**.

Briefly, the function of the circuit 45 is to alternately apply pulses to lines 48 and 49 in order to switch the thermionic switch 12 from one mode of operation to the other. As connected, circuit 45 applies a positive pulse (with respect to ground) to line 49 in order to momentarily increase the voltage across switch 12 above its ignition point in order to switch it to its high-current mode. One such pulse is designated in FIG. 5 by numeral 50. To drive the switch 12 to its low-current mode, a pulse is applied to the base of transistor 43 in order to drive the transistor to its conductive state or ON. When 43 is ON the battery 47 is applied across winding 42 inducing a voltage across winding 41. The polarity of the voltage across winding 41 is such that it opposes the voltage of source 18. Consequently, the voltage drop across 12 is reduced to be below the extinguishing voltage level to drive it to the low-current mode. Thus, by alternately applying pulses on lines 48 and 49, the switch 12 may be switched between the two modes and thereby chop the direct current provided by source 18 to load $R_L$.

It should be pointed out that of the switch control unit 25 only transformer 25*x* need be located in the high-temperature region. The transformer should be one which is capable of inducing a high-current low voltage pulse in the secondary winding 41.

From the foregoing description it should be appreciated that in accordance with the teachings of this invention a thermionic switching system is provided in which a thermionic diode is employed as a current switch, rather than as a power converter. By applying a voltage across the diode and by controlling the instantaneous voltage thereacross to be either above an ignition point or an extinguishing point the diode is operable in either a high-current mode or a low-current mode. Such a diode is connected in series with a load or a power-transferring device, such as power transformer 16, across a high-temperature D.C. power source to chop the direct current which is supplied to the load in the high-temperature region, thus eliminating the need for lossy leads between the power source and the load. Also, since such a switching diode is relatively immune to radiation it can be safely located in a high-radiation region, typical of nuclear reactors without adverse effects.

Figure 6:
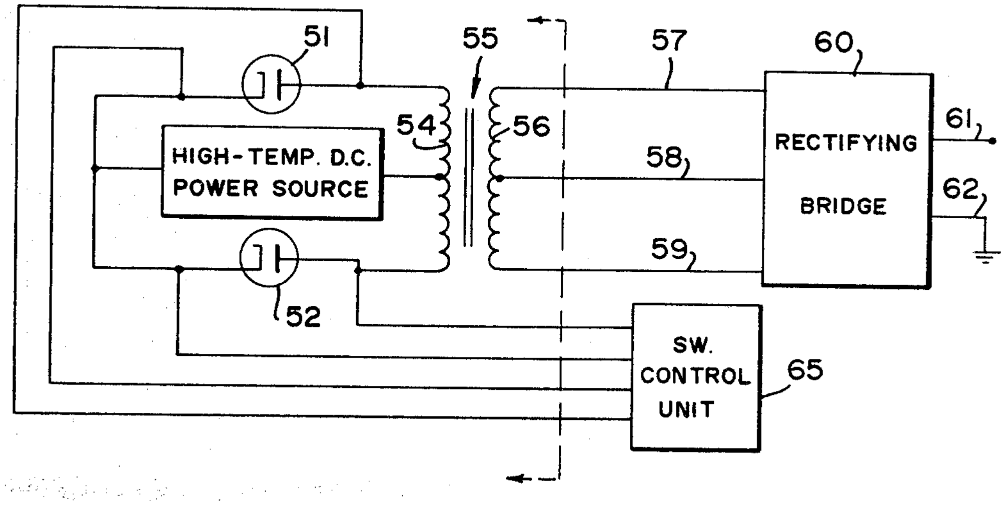

If desired, a pair of thermionic switches may be used in a push-pull type arrangement, such as is diagrammed in FIG. 6, to which reference is made herein. Therein, numerals 51 and 52 designate two thermionic switches, with their collectors shown connected to opposite ends of a primary winding 54 of a step-up transformer 55. A high-temperature D.C. power source is connected between a center tap of the primary winding 54 and the emitters of the two thermionic switches. The secondary winding 56 of transformer 55 including the winding's center tap are connected by leads 57, 58 and 59 to a rectifying bridge 60. It is bridge 60 which responds to the chopped current induced in winding 56 in the high-temperature region and rectifies it to a D.C. voltage which is shown applied across leads 61 and 62.

Figure 7:
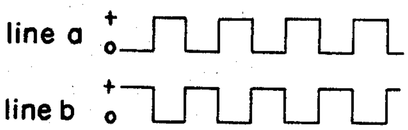
FIG. 7 is a multiline current waveform diagram useful in explaining the embodiment shown in FIG. 6.

The two thermionic switches 51 and 52 are connected to a switch control unit 65 which, like the bridge, is located in the low-temperature region. The function of unit 65 is to supply voltage pulses to the two switches simultaneously so that when one switch, such as 51, is driven from the low-current mode to the high-current mode, switch 52 is driven from the high-current mode to the low-current mode and vice versa. Thus, during one stable-state, a high-current flows in one half of winding 54 while a low-current flows in the other half. Then during a succeeding stable-state, the opposite conditions exist. The ideal current levels in the two halves of winding 54 are diagrammed in lines *a* and *b* of FIG. 7, wherein 0 represents a low-current level and + represents a high-current level. Those familiar with the design of pulsing and switching circuitry will appreciate that unit 65 is not to be considered as limited to one specific embodiment and that different arrangements may be employed to supply the two thermionic switches with voltage pulses whose functions have been described to simultaneously switch them to opposite modes.

Although particular embodiments of the invention have been described and illustrated herein, modifications and variations may readily occur to those skilled in the art and consequently it is intended that the claims be interpreted to cover such modifications and equivalents.

What is claimed is:

1. A switching system for controlling the amplitude of direct current supplied to a load in a low-temperature region from a high-temperature direct current power source in a high temperature region, said system comprising:

a single high temeperature direct current power source in said high temperature region;

at least one thermionic diode switch means operable in either a high-current mode or a low-current mode in said high-temperature region;

power transfer means in said high-temperature region connected to said load;

means connecting said switch means in series with said power transfer means across said single direct current power source in said high-temperature region; and control means for switching said at least one thermionic diode switch means between its two modes of operation to control the amplitude of the direct current which is applied across said power transfer means for supply to said load, said thermionic diode switch means having an emitter and a collector fixedly spaced from said emitter, said diode being characterized by an ignition point which defines a first voltage magnitude across said diode above which said diode is switchable to said high-current mode, said diode being further characterized by an extinction point which defines a second voltage magnitude below which said diode is switched to said low-current mode, and said switch means includes means for increasing the voltage drop across said diode above said first voltage magnitude when said diode is operable in said low-current mode to switch it to operate in said high-current mode, said switch means further including means for decreasing the voltage across said diode below said second voltage magnitude when said diode is operable in said high-current mode to switch it to operate in said low-current mode, and said control means include pulse providing means for applying voltage pulses to said thermionic diode switch means to switch it between its modes of operation as a function of the voltage applied thereacross.

2. The switching system as recited in claim 1 wherein said power transfer means comprises a power transformer having a primary winding and a secondary winding, said secondary winding being connected to said load, said system comprising a single thermionic diode switch means which is connected in series with the entire primary winding across said power source, whereby the amplitude of the direct current is across the entire primary winding and the polarity of said direct current across the primary winding being unipolar and a function of the polarity of the direct current from said power source.

3. The thermionic switching system as recited in Claim 2 wherein said thermionic diode switch means defines and emitter and a collector spaced from said emitter at a distance in the range of 0.030 inch, and the emitter temperature is not greater than 1400° K.

4. The thermionic switching system as recited in claim 2 wherein said first and second potential magnitudes are in the ranges of 4 volts and 0.5 volt, respectively, and the ratio of current amplitude in said high-current and low-current modes of operation is in the order of 100.

5. A switching system for controlling the amplitudes and polarity of a direct current supplied to a load in a low-temperature region from a high-temperature direct current power source in a high temperature region, said system comprising:

first and second thermionic diode switch means in said high temperature region each of said thermionic diode switch means having an emitter and a collector fixedly spaced from said emitter, said diode being characterized by an ignition point which defines a first voltage magnitude across said diode above which said diode is switchable to said high-current mode, said diode being further characterized by an extinction point which defines a second voltage magnitude below which said diode is switched to said low-current mode, and said means includes means for increasing the voltage drop across said diode above said first voltage magnitude when said diode is operable in said low-current mode to switch it to operate in said high-current mode, said switch means further including means for decreasing the voltage across said diode below said second voltage magnitude when said diode is operable in said high-current mode to switch it to operate in said low-current mode; low-current mode to switch it to operate in said high-current mode, said switch means further including means for decreasing the voltage across said diode below said second voltage magnitude when said diode is operable in said high-current mode to switch it to operate in said low-current mode;

a power transformer having primary and secondary windings in said high-temperature region;

a single high-temperature direct current power source in said high-temperature region;

means connecting one portion of said primary winding in series with said first thermionic diode switch means across said power source;

means connecting the rest of said primary winding excluding said one portion in series with said second thermionic diode switch means across said power source;

connecting means including rectifying means for connecting said secondary winding to said load; and control means for switching said first and second thermionic diode switch means between their high-current and low-current modes, and for controlling said switch means so that at any time one of them is in the high-current mode and the other is in the low-current mode.

6. The thermionic switching system as recited in claim 5 wherein each said thermionic diode switch means defines an emitter and a collector spaced from said emitter at a distance in the range of 0.030 inch, and the emitter temperature is not greater than 1400° K.

7. The thermionic switching system as recited in claim 5 wherein said first and second potential magnitudes are in the ranges of 4 volts and 0.5 volt, respectively, and the ratio of current amplitude in said high-current and low-current modes of operation is in the order of 100.

References Cited

UNITED STATES PATENTS

| | | | |
|---|---|---|---|
| 3,146,388 | 8/1964 | Rasor | 310—4 X |
| 3,273,048 | 9/1966 | Hoff et al. | 310—4 X |
| 3,302,095 | 1/1967 | Bell et al. | 321—35 |
| 3,381,201 | 4/1968 | Angello | 321—2 |
| 3,437,910 | 4/1969 | Haring et al. | 322—2 |

J D MILLER, Primary Examiner

W. H. BEHA, Jr., Assistant Examiner

U.S. Cl. X.R.

310—4; 321—35; 322—4